United States Patent
Kolze et al.

(10) Patent No.: US 10,574,426 B2
(45) Date of Patent: Feb. 25, 2020

(54) FULL DUPLEX RANGING SYSTEMS AND METHODS

(71) Applicant: AVAGO TECHNOLOGIES INTERNATIONAL SALES PTE. LIMITED

(72) Inventors: Thomas J. Kolze, Phoenix, AZ (US); Avi Kliger, Ramat-Gan (IL)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

(21) Appl. No.: 15/974,209

(22) Filed: May 8, 2018

(65) Prior Publication Data

US 2019/0068353 A1    Feb. 28, 2019

Related U.S. Application Data

(60) Provisional application No. 62/551,088, filed on Aug. 28, 2017.

(51) Int. Cl.
| | |
|---|---|
| H04L 5/14 | (2006.01) |
| H04L 12/24 | (2006.01) |
| H04L 12/28 | (2006.01) |
| H04L 12/26 | (2006.01) |

(52) U.S. Cl.
CPC ............ *H04L 5/14* (2013.01); *H04L 12/2801* (2013.01); *H04L 41/0853* (2013.01); *H04L 43/10* (2013.01)

(58) Field of Classification Search
CPC ... H04L 12/2801; H04L 41/0853; H04L 5/14; H04L 43/10

USPC .......................................................... 370/252
See application file for complete search history.

(56) References Cited

U.S. PATENT DOCUMENTS

| | | | | |
|---|---|---|---|---|
| 9,479,353 B2* | 10/2016 | Meng | ................... | H04L 12/2801 |
| 2006/0126660 A1* | 6/2006 | Denney | ................. | H04J 3/1694 |
| | | | | 370/468 |
| 2010/0148940 A1* | 6/2010 | Gelvin | ................... | G06F 15/173 |
| | | | | 340/286.02 |
| 2012/0032855 A1* | 2/2012 | Reede | ................... | G01S 5/0289 |
| | | | | 342/458 |
| 2014/0033263 A1* | 1/2014 | Okamura | ........... | H04N 21/6168 |
| | | | | 725/116 |
| 2014/0177741 A1* | 6/2014 | Liu | ...................... | H04L 29/0653 |
| | | | | 375/260 |
| 2015/0295838 A1* | 10/2015 | Liu | ....................... | H04L 5/0007 |
| | | | | 370/235 |
| 2015/0373715 A1* | 12/2015 | Kliger | ................... | H04W 52/18 |
| | | | | 370/329 |
| 2016/0344589 A1* | 11/2016 | Ling | ...................... | H04L 1/0009 |
| 2017/0163486 A1* | 6/2017 | Ling | ...................... | H04L 1/0009 |

(Continued)

*Primary Examiner* — Phong La
(74) *Attorney, Agent, or Firm* — Xsensus, LLP

(57) ABSTRACT

A system and method perform fine ranging on a plurality of cable modems in a network and distribute results. A CMTS grants access to a full duplex ranging probe to the plurality of cable modems, and probe results are distributed to the plurality of cable modems. A receive modulation error ratio (RxMER) uploaded from respective of the plurality of cable modems, and the CMTS identifies an interference group (IG) and bits/symbol for the plurality of cable modems in a given sub-band. Full duplex operation is then performed in the given sub-band with known IG and bits/symbol.

17 Claims, 2 Drawing Sheets

(56) References Cited

U.S. PATENT DOCUMENTS

2018/0076910 A1* 3/2018 Zhang .................... H04B 17/24
2018/0102868 A1* 4/2018 Sundaresan ........... H04L 5/0007

* cited by examiner

FULL DUPLEX RANGING SYSTEMS AND METHODS

CROSS-REFERENCE TO RELATED APPLICATION

This application claims the benefit of U.S. Provisional Application No. 62/551,088, filed Aug. 28, 2017, which is incorporated herein by reference in its entirety.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Data Over Cable Service Interface Specification (DOCSIS) is an international telecommunications standard that permits the addition of high-bandwidth data transfer to an existing cable TV (CATV) system. DOCSIS 3.1 Full Duplex is an improvement on DOCSIS 3.1 and uses the part of the full spectrum of a Cable Modem's (CM's) operational range (5 MHz to about 1.2 GHz) at the same time in both up and down streams, for example, 108 MHz to 684 MHz may be used for Full Duplex operation. During the CM registration process in the RF physical layer, downstream radio frequency signals are sent from the cable modem terminal system (CMTS) to the CM and upstream radio frequency signals are transmitted from the CM to the CMTS (in RF signals). Media Access Control (MAC) Layer information is contained on the RF signals and internet protocol (IP) data is encapsulated in the MAC Layer data, and so the data is transported by the RF signals between the cable modem and different servers located beyond the CMTS. The CMTS acts as a relay for the data sent between the cable modem and IP servers. These multiple services of communications are built on top of each other and are done according to the Open Systems Interconnection (OSI) model.

SUMMARY

As discussed herein, the present disclosure describes a seven step procedure for obtaining a first FDX sub-band operational for Full Duplex, and also for subsequent sub-bands operating Full Duplex, with minimum number of RBA changes. The seven step procedure is implemented in a controller for a cable modem (CM). The controller for the CM includes circuitry configured to perform full duplex in a CM network in a band of 108 MHz to 684 MHz, or a subset thereof, where a CM that is coming on-line performs both ranging and sounding, wherein the ranging is performed before the sounding.

Additionally, a CM full duplex ranging method includes performing fine ranging on a plurality of CMs in a network, and distributing fine ranging results to the plurality of CMs. Further, the method includes issuing from a cable modem termination system (CMTS) a grant for a full duplex ranging probe to the plurality of CMs, distributing range probe results to the plurality of CMs. Further, the method includes issuing from the CMTS a grant for sounding signals to the plurality of CMs, and uploading a receive modulation error ratio (RxMER) from each of the plurality of CMs, identifying at the CMTS an interference group (IG) and bits/symbol for the plurality of CMs in a given sub-band, and performing full duplex operation in the given sub-band with known IG and bits/symbol.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more."

Figure 1:
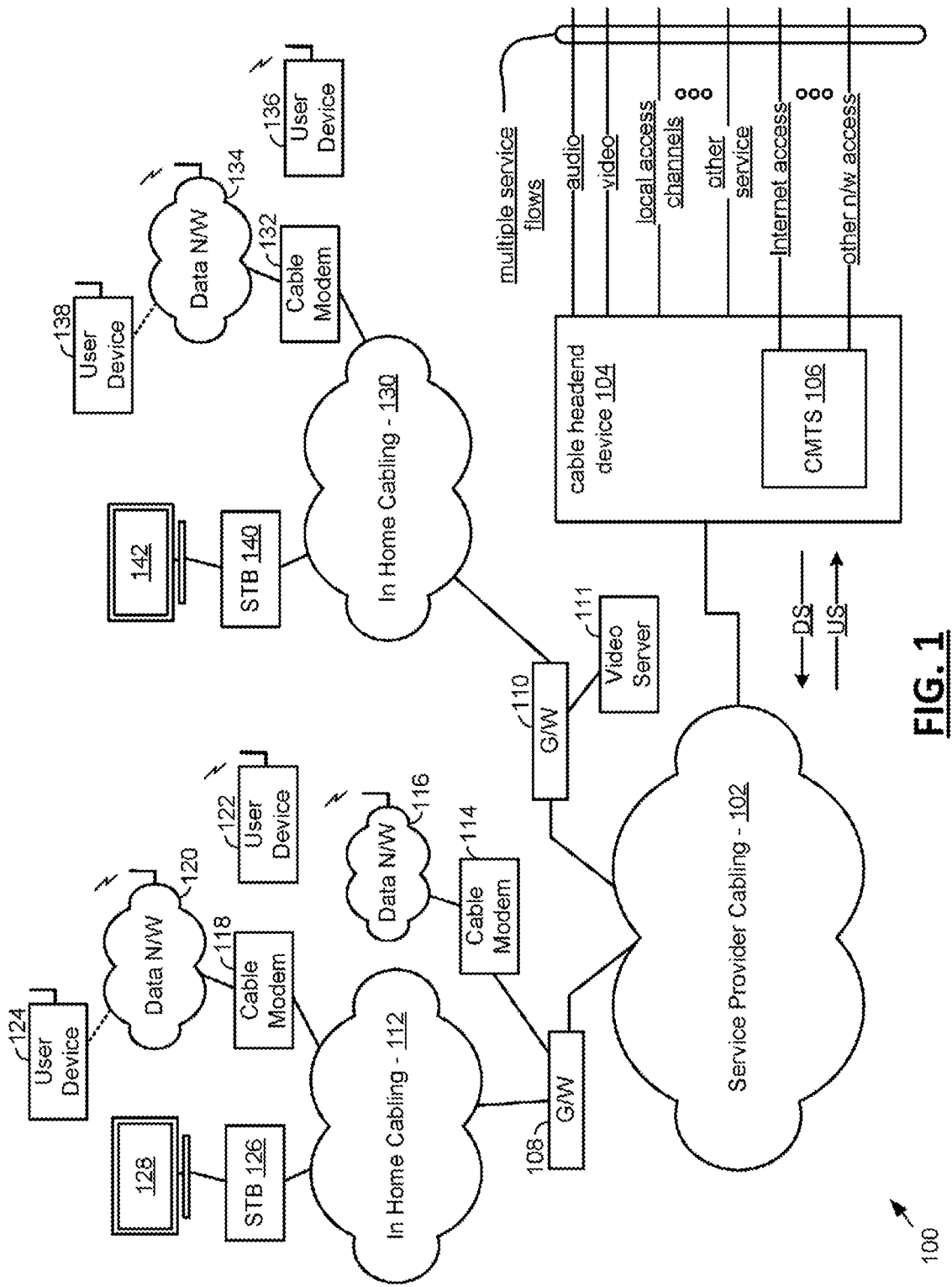
FIG. 1 is an exemplary system diagram illustrating a cable network including service provider equipment and in-home equipment constructed and operating according to one or more embodiments of the present disclosure.

Referring now to the drawings, wherein like reference numerals designate identical or corresponding parts throughout the several views, FIG. 1 illustrates system 100 including a cable network including service provider equipment and in-home equipment constructed and operating according to one or more embodiments of the present disclosure. A cable headend device 104 provides service to a plurality of customers via service provider cabling 102. The service provider cabling 102 is generally referred to as cable plant and may be implemented, at least in part, as a hybrid fiber-coaxial (HFC) network (e.g., including various wired and/or optical fiber communication segments, light sources, light or photo detection complements, etc.). One embodiment also applies to wireless communications networks operating in full duplex operation in at least part of the network spectrum. Additionally, one embodiment, applies to wireless communications networks with the similar many-to-one upstream and one-to-many downstream topology as practiced in cable plants, such as cellular systems.

A single cable headend device 104 can service hundreds or thousands of customers via the service provider cabling 102 (only two serviced homes/premises are shown in FIG. 1 for brevity). The cable headend device 104 supports a number of service flows such as audio, video, local access channels, as well as any other services. The cable headend device 104 also services one or more cable modem termination systems (CMTS) 106 that provide(s) network service (e.g., Internet, other network access, etc.) to a plurality of customer devices by exchanging digital signals with CMs 114, 118 and 132 of subscribers. Generally, downstream (DS) information flows from the CMTS 106 to the subscribers and upstream (US) information flows from the subscribers to the CMTS 106. In FDX, and in Remote PHY architectures, some of the CMTS functionality may reside in a Node, which is within the HFC cable network, which does not alter the application of the features in this disclosure or the advantages or teachings herein. In this description whether or not some functions are performed in a Node or within a CMTS completely contained within a cable headend is not important to the practice of the inventive concepts described herein, as those skilled in the art will recognize.

The cable headend device 104 interfaces with customer premises equipment, including cable network gateways 108 and 110, CMs 114, 118, and 132, and set top boxes (STBs) 126 and 140, each of which is located in a home or other premises of a subscriber. STBs 126 and 140 support coupled audio visual systems 128 and 142, respectively. In home cabling 112 and 130 supports communications for the STBs 126 and 140 and the CMs 114, 118 and 132 via the cable network gateways 108 and 110. Generally, the cable headend device 104 broadcasts audio and video including local access channels to the STBs 126 and 140 and other devices within the home capable of interfacing with the cable headend device 104. Services also include video on demand, audio on demand, and may include Over the Top services.

The CMTS 106 provides Internet access to the cable modems 114, 118, and 132. Cable modems 114, 118, and 132 in turn support data networks 116, 120, and 134, respectively, which service user devices 122, 124, 136, and 138. These data networks may be Local Area Networks (LANs), Wireless Local Area Networks (WLANs), Personal Area Networks, or other types of networks. The data networks may support streaming of audio and video via supported services that stream audio and data via the Internet, e.g., Pandora®, Netflix®, Hulu®, etc.

The cable headend device 104 operates according to a standardized communication protocol such as the Data Over Cable Interface Specification (DOCSIS) 2.0, 3.0, 3.1 and/or predecessor/successor standards. In such case, the STBs 126 and 140 must support such standardized communication protocol(s). Further, the cable network gateways 108 and 110 may also support the Multimedia over Coaxial Access (MoCA) standardized communication protocol. With such operations, one or more of the cable network gateways 108 and 110 may support audio video storage (via video server 111, for example) and streaming to devices within the home. Further, with such operations, one or more of the devices within the home may stream to other devices in the home.

According to the present disclosure, the cable headend device 104 supports communications that create operational conflicts with communications within the home. Thus, according to the present disclosure the cable network gateways 108 and 110 receive a downstream broadband signal via service provider cabling 102, e.g., a DOCSIS 3.0 or 3.1 signal (and/or any version that is inconsistent with DOCSIS 2.0 and/or predecessor standard). The cable network gateways 108 and 110 then convert the downstream broadband signal to a digital downstream broadband signal. Then, the cable network gateways 108 and 110 low pass filter the digital downstream broadband signal to produce a filtered digitized downstream broadband signal. The cable network gateways 108 also produce or service a digital in-home communications signal, e.g., a MoCA signal that overlaps the upper spectrum. The cable network gateways 108 and 110 then sum the filtered digitized downstream broadband signal with the digital in-home communications signal to produce a combined digital signal, convert the combined digital signal to a combined analog signal, and transmit the combined analog signal via in-home cabling 112 and 130, respectively, for receipt by other devices within the home, e.g., STBs 126 and 140 and/or cable modems 118 and 132.

Figure 2:
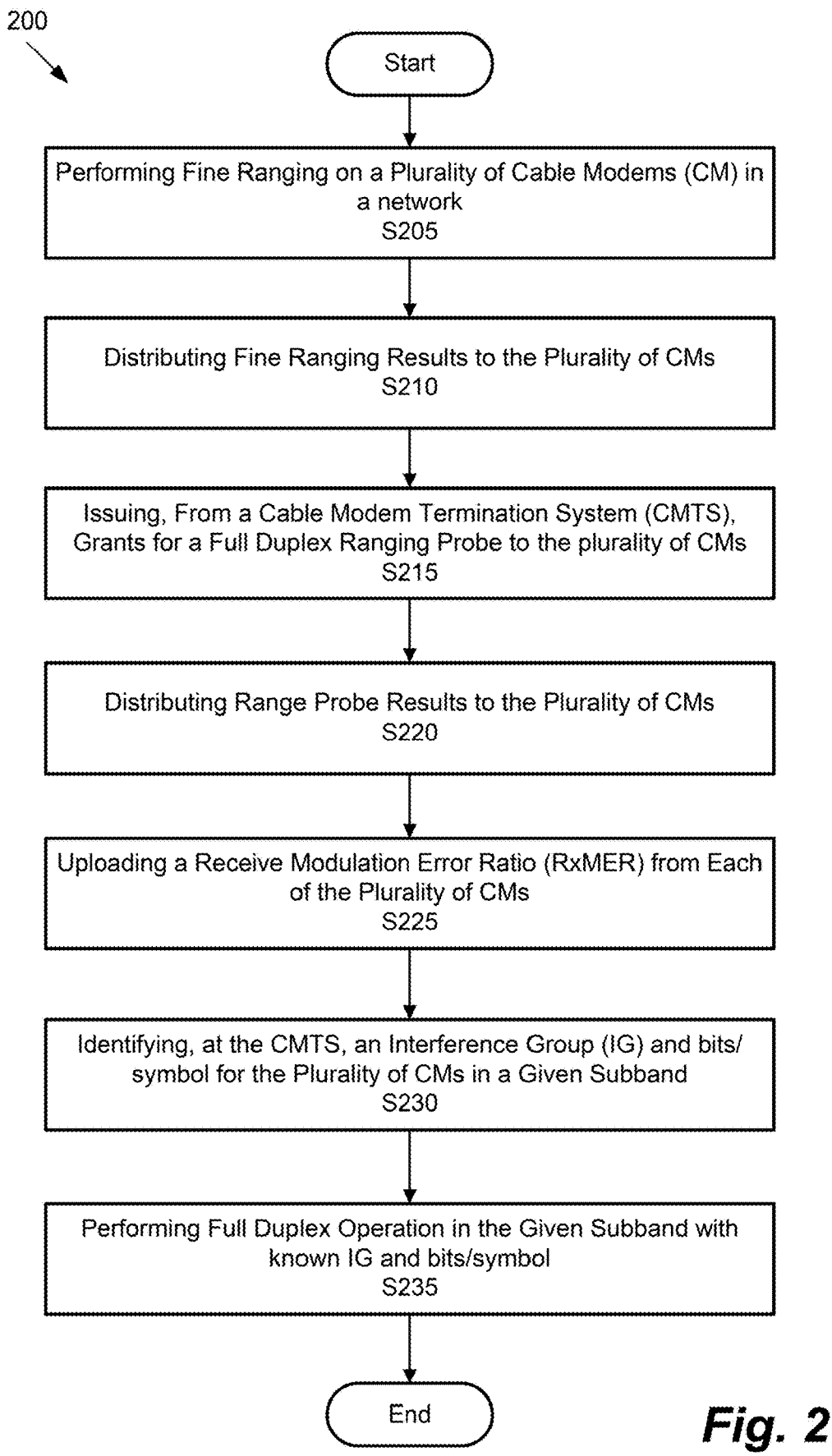
FIG. 2 is an exemplary work flow diagram of a method for implementing a ranging-first full duplex system according to one or more aspects of the present disclosure.

FIG. 2 is an exemplary workflow of a method 200 for implementing a ranging-first full duplex system according to one or more aspects of the present disclosure. For example, the method 200 may be implemented in the system 100.

Generally, an approach for ranging-first in an FDX system is disclosed herein. In one implementation, consideration can be for an FDX-only system of CMs that does not consider legacy CMs. The approach may be practiced with systems which include FDX-L CMs, as well, but the sounding step is anticipated to take much longer transmission and measuring when the measuring CMs are FDX-L. The approach outlined is based on physical (PHY) principles and is focused on simplicity and effectiveness. Various tradeoffs are possible which can include time to full system readiness, complexity in CMs, and MAC complexity. In one implementation, the most basic approach requires minimal resource block assignment (RBA) switching and minimal impact to downstream service. Note that a first sounding may be accomplished on the ranging probe (S215) or may be accomplished by a separate sounding signal transmission (which may occurs after S220), and sounding culminates with S225 and S230. The sounding signal may have a PSD that is 9 dB above the data power level determined from, for example, fine ranging, but the power level of the sounding signal may be set relative to other signals described herein, such as the fine ranging probe, as one of ordinary skill would recognize. Note also prior to completion of S230 in a first ranging and first sounding, the CM does not have an IG assignment or association, and in one embodiment does not have RBA assignments. If this is a CM or plurality of CMs joining full duplex operation of an existing FDX system, with IG assignments existing for one or a plurality of CMs already, then minimizing RBA switching is advantageous. The following describes what can be achieved (i.e., getting FDX system operational in Full Duplex) in terms of simplicity and effectiveness from the PHY perspective.

More specifically, the approach for getting a ranging-first FDX system operational in Full Duplex includes a seven step process to Full Duplex operation from the PHY perspective. It should be appreciated that the seven steps can be performed in a different order (as described herein) and/or one or more of the steps can be performed at the same time (as described herein). For example, the ranging probe may have a dual use as a sounding probe. Also, for example, the ranging probe may be transmitted before the results of fine ranging are distributed, by using the same transmit power level for the ranging probe as for the fine ranging. Results of fine ranging and ranging probe may be distributed as the same step, more or less concurrently, if the ranging probe is transmitted prior to the results of the fine ranging. The aforementioned are examples of combining steps or moving a step relative to another step, where advantages of practicing this method are maintained and even enhanced due to higher efficiency of the steps as is apparent. Also the terms ranging and ranging signal, may be used to refer to fine ranging bursts, or ranging probes, or either or both, Ranging is used in conventional upstream simplex (e.g., half duplex) legacy systems (5 MHz to 85 MHz) cable modem networks, such as DOCSIS 3.1. DOCSIS 3.1 also encompasses different upstream spectrum, such as 5-204 MHz, among other options. The dynamic range (range of strongest to weakest) transmitted data signal is 36 dB or ~45 dB, and ranging signals can have an even wider dynamic range, depending on which version of the legacy system. When bringing a new CM into the network, the network administrator (i.e., the multiple-system operator (MSO)) has a strong interest in (a) minimizing disruption to devices that are actively using the network (e.g., avoiding spurious and harmonic interference from and to other CMs that are already registered and operating on the network) and (b) minimizing the downtime that might be created as a result of a long registration period for a CM and the signaling interference that causes downtime (or a reduced data rate) to other CMs. Conventional ranging allows the CM to do channel equalization and provide a feedback signal to the CM so the transmitter can adjust its power to an ideal level. The ideal level strikes a balance between sufficient data rate (and bit error rate (BER)) but avoids creating interference that disrupts communications with other CMs. Accordingly, a ranging-first system has several advantages as further described herein.

An FDX system that performs sounding-first and ranging-second in a full-duplex system is flawed because, among other things, it is unclear at what power level to perform the sounding. If driven too high, the spurious (out of band interference) limits communications with other CMs, but if driven too low, the signals cannot be received and so the process needs to repeat with increased transmit power, but in turn this increases registration time, and thus the time the network is disrupted.

Performing ranging-first is faster than sounding-first. For example, a system level 15 dB dynamic range (i.e., the range of powers needed to be transmitted by the CMs for them to work properly in a network) is all that is needed for the CMs in the FDX system. This range of transmit signals allows for the registration of new CMs (using a low level fine ranging signal or burst) while allowing other CMs to run normally at levels that are 15 dB higher. This is a significant benefit because spurious noise in the network is reduced to a manageable level, while also allowing for rapid registration. In other words, the Dynamic Range required of a CM is now small enough, and the reception of the upstream fine ranging burst is robust enough, that with transmitting the fine ranging burst (S205) at the minimal level it will still be guaranteed to be "heard" at the FDX Node upstream receiver. There is no need for guess work or "hunting" for the first transmission of the fine ranging burst.

The fine ranging burst (S205) can be set at −15 dB with respect to the highest level of the sounding signals (or steady state operation while transmitting data). Note that the level of the fine ranging burst is the power spectral density level, i.e., the PSD. Due to the robustness of the fine ranging burst, the ranging signal can be transmitted at the minimum level (PSD) of the CM's full dynamic range (−15 dB), so the level of the ranging signal can be known without experimentation (this is much faster and less disruptive than the conventional philosophy).

In one embodiment, a dynamic range of transmit power for CMs in the network can be restricted to 20 dB. Alternatively, a dynamic range of transmit power for CMs in the network can be restricted to 15 dB. Further, a ranging signal can be set to a low end of a dynamic range of the CM network, wherein an initial sounding signal can be set after the initial ranging signal at 10 dB above the ranging signal power. Alternatively, in one embodiment, the initial sounding signal can be set at 15 dB above the ranging signal power. Alternatively, in one embodiment, the initial sounding signal can be set at 20 dB above the ranging signal power. While in one embodiment a ranging probe can be set at the low end of the dynamic range for the CM transmissions, in an alternative embodiment a ranging probe can be set at the same power level (PSD) determined for the CM data transmissions as a result of the fine ranging (S205 and S210). In one embodiment a sounding signal separate from a ranging probe may be set at the same power level (PSD) determined for the CM data transmissions as a result of the fine ranging (S205 and S210), and in alternative embodiment the sounding signal can be set at a higher power level, such as 9 dB higher than the PSD of the data transmissions resulted from the fine ranging.

Also, to assist a Measurer CM which may use the ranging signal (S215) to also perform sounding measurements, in a dual-use of the ranging signals, a 180° phase shift can be included on selected symbols from the transmitting CM so the Measurer CM can develop more information about the nature of the interference from the Testing CM (transmitting the ranging signal in this case), such as using the knowledge of the phase transitions in the sequence to determine the relative timing of the transmitting CM symbol start times relative to the downstream symbol start times, as received at the Measurer CM. An example of a sequence with phase transitions is a Barker sequence. Barker-like sequences are suitable as well, which are sequences which are close to Barker sequences, such as (for example) one additional symbol in length compared to a Barker sequence; such sequences do not contain the Barker sequence desirable properties, exactly, but still provide advantage to the Measurer CM and while not offering the full degree of benefit of a Barker sequence, offer advantages over unmodulated sequences in respects.

In S205, fine ranging can be performed on one or a plurality of cable modems (CM) in a network. Fine ranging can be used reliably at −15 dB, for example. Further, the CM Tx power spectral density (PSD) can be at 15 dB below the upstream reference PSD, −15 dB can be the lowest allowed upstream Tx PSD, and there is a very high probability of successful ranging. Additionally, since fine ranging can be used successfully at the lowest allowed PSD, this is a logical first step in any initialization process. For example, when K=16 OFDMA (orthogonal frequency division multiple access) symbols in a frame are used in the overview, there can be 50 kHz subcarrier spacing, 5 microsecond cyclic prefix, and 400 microsecond frame. Additionally, 80 CMs fine ranging opportunities can be granted back-to-back corresponding to 32 milliseconds total, wherein all CMs fine range transmissions can be completed in 32 milliseconds.

Further, the fine ranging opportunities can be segmented into smaller amounts and distributed over a longer time-frame. Or since fine ranging does not occupy a large amount of spectrum, multiple CMs can send their fine ranging bursts simultaneously, using different subcarriers.

In S210, fine ranging results can be distributed to the plurality of CMs. Additionally, in S210, downstream use may resume while CMTS processes and distributes the results of the "bulk" fine ranging. This results in minimal resource block assignment (RBA) switching since all CMs fine range in 32 milliseconds in the first sub-band to be initialized before all go back to receiving downstream, in one embodiment. In one implementation, if bulk fine ranging is problematic, a smaller number of CMs may fine range back-to-back. As a result, this may reduce processing load of the FDX Node and CMTS, reduce max downstream outage time, although total DS outage may be longer due to RBA changes back-and-forth, and the CMTS may choose to segment or not. Eventually the CMTS can issue the grants for FDX ranging probe to each CM. Further to the example in S205, the same K=16 OFDMA symbols in a frame can be used resulting in a 400 microsecond frame, for example. Additionally, grants to 80 CMs FDX ranging probe (RP) can be distributed back-to-back, or the grants can be segmented.

In S215, grants for an FDX ranging probe can be issued to the plurality of CMs from a CMTS. Additionally, all CMS may FDX probe back-to-back. Eventually the CMTS issues the grants for FDX ranging probe to each CM such that, further to the example in S205 and S210, the same K=16 OFDMA corresponds to 400 microsecond frame, same as for FR, for example. This is assuming a 5 microsecond cyclic prefix, but this is purely an example and any cyclic prefix of those available may be selected, which will alter (slightly) the frame duration. Additionally, 80 CMs FDX ranging probe can be granted back-to-back corresponding to 32 milliseconds total and all CM's FDX ranging probe transmissions can be completed in just 32 milliseconds. Further, back-to-back ranging probe grants can include a new RBA mode such that during the 32 milliseconds, downstream in the sub-band is zero bit loading (ZBL) and each FDX CM is monitoring and processing receive modulation error ratio (RxMER) on all subcarriers in 31.6 milliseconds (79 grants). If for any reason bulk FDX ranging probe is problematic, smaller number of CMs may receive back-to-back ranging probe grants which can reduce back-to-back processing load of CMs and reduces max downstream outage time. During the ranging probe transmission, the CM may also train its echo cancelers.

In S220, ranging probe results can be distributed to the plurality of CMs. Additionally, use of downstream may resume while CMTS processes and distributes the results of the "bulk" FDX ranging probes, if the downstream in the FDX spectrum is being utilized already. As a result, RBA switching is minimal since all CMs fine range in 32 milliseconds in the first sub-band to be initialized and then all go back to receiving downstream, in one exemplary embodiment. And CMs already operational in full duplex operation, or already receiving downstream in the subband where the one or plurality of CMs are ranging, may resume reception of this downstream. Downstream Protection mechanisms may be provided in one embodiment to minimize the impact to downstream reception in CMs while one or a plurality of CMs transmit ranging signals, further enhancing the advantages of ranging first. If for any reason bulk FDX ranging probe is problematic, a smaller number of CMs may range probe back-to-back. This may reduce processing load of FDX node and CMTS and CMs, reduce max downstream outage time, and CMTS can choose segmenting or not, but the choice may also be dependent on FDX CM required capabilities. Eventually the CMTS issues pre-equalization results to each CM.

In an exemplary embodiment where a separate sounding transmission is used, rather than obtaining the dual use of the ranging probe S215, the CMTS issue grants for the sounding transmission to the plurality of CMs after S220. Then, in S225, a receive modulation error ratio (RxMER) can be uploaded from each of the plurality of CMs after the sounding transmission(s).

In S230, an interference group (IG) and bits/symbol can be identified at the CMTS for the plurality of CMs in a given sub-band.

Regarding S225 and S230, in one exemplary embodiment, CMs can finish computing the "bulk" RxMER for each of the other 79 CMs in the node, for example. Use of downstream may continue while CMs process and distribute (upload) to the CMTS the results of the "bulk" RxMER measured during the FDX ranging probes of the other 79 CMs. Each CM reports the OH/MA channel RxMER for when the 79 other CMs are transmitting. Additionally, CMTS accepts and processes all the RxMER for all 80 CMs, and CMTS computes the IGs and bits/symbols for all CMs in the sub-band. As a result, the initial sounding can be completed and all IGs are assigned such that all bits/symbol can be known by CMTS.

In S235, full duplex operation can be performed in the given sub-band with known IG and bits/symbol. Additionally, the FDX system is now completely ready for Full Duplex operation on the sub-band because the IGs are known and the bits/symbols for the sub-band are known. Subsequent operations on this and other sub-bands may rely on IG knowledge/assignment. Further, refinement of echo cancelling training may be in order to accommodate the pre-equalization (e.g., from the first ranging probe). Using a second or additional ranging probe (or other training scheme) with the new pre-equalization in place may be justified. Additionally, refinement of RxMER with pre-equalization is not expected to be needed, but is not prohibited. The pre-equalization is zero-impact to channel power received at the FDX node. In one implementation, sharpening the RxMER per subcarrier may be desired, but not needed for initial IG assignment or initial bit/sym.

Regarding the FDX ranging probe, it should be appreciated that example calculations in S205 through S235 used K=16 OFDMA symbol frame, with 15-symbols transmitted. Due to 3 millisecond (max) delay or offset from one CM transmit to another CM receive, the "silent" OFDMA symbol is provided. The FDX fine ranging burst is suggested to be the D3.1 fine ranging burst in one embodiment. The FDX ranging probe is suggested to be the D3.1 ranging probe, in one embodiment. In another embodiment, the FDX ranging probe is suggested to be the D3.1 ranging probe, but modified such that the silent OFDMA symbol is provided, the first FDX ranging probe OFDMA symbol is the same as D3.1, subsequent FDX ranging probe OFDMA symbols use a fixed (in the requirements) time-domain pseudo random binary sequence (PRBS) overlay multiply by +1 or −1, the general case for the FDX ranging probe may provide different values of "non-silent" OFDMA symbols, such as 7 (perhaps K=8), or 11, or 13 (with K=16) (in these cases the time-domain PRBS is the Barker Code of that length), and for other instances of "non-silent" symbols which are not Barker Code compatible, a "near Barker code" would be fixed in the requirements.

Accordingly, a seven step procedure for obtaining a first FDX sub-band operational for Full Duplex includes minimal number of RBA changes, a new RBA mode introduced for FDX ranging probe transmission and RxMER processing, while other CMs transmit their ranging probe, only 64 microseconds of downstream outage for the initial sub-bands, and the D3.1 Ranging Probe is modified to provide a time-domain overlay PRBS multiplication, wherein each subcarrier may transmit a Barker Code sequence (with 7, 11, or 13 "non-silent" OFDMA symbols in the RP) or "near" Barker Code.

Additionally, it should be appreciated that the initial sounding signal or periodic sounding signal can beset at the signal level derived from the initial ranging signal, at the same level as for subsequent CM upstream data transmissions. Further, the initial sounding signal or periodic sounding signal can be set at up to 9 dB higher than the upstream data transmissions. Alternatively, the initial sounding signal or periodic sounding signal is set more than 9 dB higher than the upstream data transmissions.

In the above description of FIG. 2, any processes, descriptions or blocks in the workflow can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein may be used independently of one another, or may be combined in various ways. All possible combinations and sub-combinations are intended to fall within the scope of this disclosure.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as failing within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A controller for a cable modem (CM), comprising:
   circuitry configured to
      perform full duplex communication in a CM network in a predetermined band, and
      cause the CM to perform ranging and sounding when the CM comes on-line, the ranging being performed before the sounding, and a ranging signal power being lower than a power of the initial sounding signal,
   wherein the ranging signal power is set to a low end of a dynamic range of the CM network,
   wherein the initial sounding signal is set at the data power level for the CM determined by the controller, after receiving the ranging signal power, and
   wherein the initial sounding signal is set 9 dB higher than the data power level for the CM determined by the controller, after receiving the ranging signal power.

2. The controller for the CM of claim 1, wherein a dynamic range of transmit power for CMs in the network is restricted to one of 20 dB or 15 dB.

3. The controller for the CM of claim 1, wherein the initial sounding signal is set after the initial ranging signal at 10 dB above the ranging signal power.

4. The controller for the CM of claim 3, wherein the circuitry is further configured to shift phases of at least one of symbols of the ranging signal power, wherein the phases are shifted by 180 degree.

5. The controller for the CM of claim 1, wherein the initial sounding signal is set at 15 dB above the ranging signal power.

6. A cable modem (CM) full duplex ranging method comprising:
   performing fine ranging on a plurality of cable modems in a network;
   distributing fine ranging results to the plurality of cable modems;
   issuing from a cable modem termination system (CMTS) a grant for a full duplex ranging probe to the plurality of cable modems;
   distributing range probe results to the plurality of cable modems;
   uploading a receive modulation error ratio (RxMER) from each of the plurality of cable modems;
   identifying at the CMTS an interference group (IG) and bits/symbol for the plurality of cable modems in a given sub-band; and
   performing full duplex operation in the given sub-band with known IG and bits/symbol, wherein
   a ranging signal power is lower than a power of the initial sounding signal.

7. The method of claim 6, wherein a dynamic range of transmit power for CMs in the network is restricted to one of 20 dB or 15 dB.

8. The method of claim 6, wherein the ranging signal power is set to a low end of a dynamic range of the network.

9. The method of claim 8, wherein the initial sounding signal is set after the initial ranging signal at 10 dB above the ranging signal power.

10. The method of claim 9, further comprising:
    shifting phases of at least one of symbols of the ranging signal power, wherein the phases are shifted by 180°.

11. The method of claim 8, wherein the initial sounding signal is transmitted after distributing range probe results to the plurality of cable modems.

12. The method of claim 11, wherein the initial sounding signal is set at the data power level determined for the CM after transmission of the ranging signal power.

13. The method of claim 12, wherein the initial sounding signal is set 9 dB higher than the data power level determined for the CM after transmission of the ranging signal power.

14. A non-transitory computer-readable storage medium storing computer-readable instructions thereon which, when executed by a computer, cause the computer to perform a method, the method comprising:
   performing fine ranging on a plurality of cable modems in a network;

distributing line ranging results to the plurality of cable modems;
issuing from a cable modem termination system (CMTS) a grant for a full duplex ranging probe to the plurality of cable modems;
distributing range probe results to the plurality of cable modems;
uploading a receive modulation error ratio (RxMER) from each of the plurality of cable modems;
identifying at the CMTS an interference group (IG) and bits/symbol for the plurality of cable modems in a given sub-hand; and
performing full duplex operation in the given sub-band with known IG and bits/symbol, wherein
a ranging signal power is lower than a power of the initial sounding signal.

15. The non-transitory computer-readable storage medium of claim 14, wherein a dynamic range of transmit power for cable modems (CMs) in the network is restricted to 20 dB or 15 dB.

16. The non-transitory computer-readable storage medium of claim 14, wherein the initial sounding signal is set 9 dB higher than a data power level determined for a cable modem (CM) after transmission of the ranging signal.

17. The non-transitory computer-readable storage medium of claim 16, further comprising:
shifting the phases of one or more symbols of the ranging signal power, wherein the phases are shifted by 180°.

* * * * *